Figure 1:
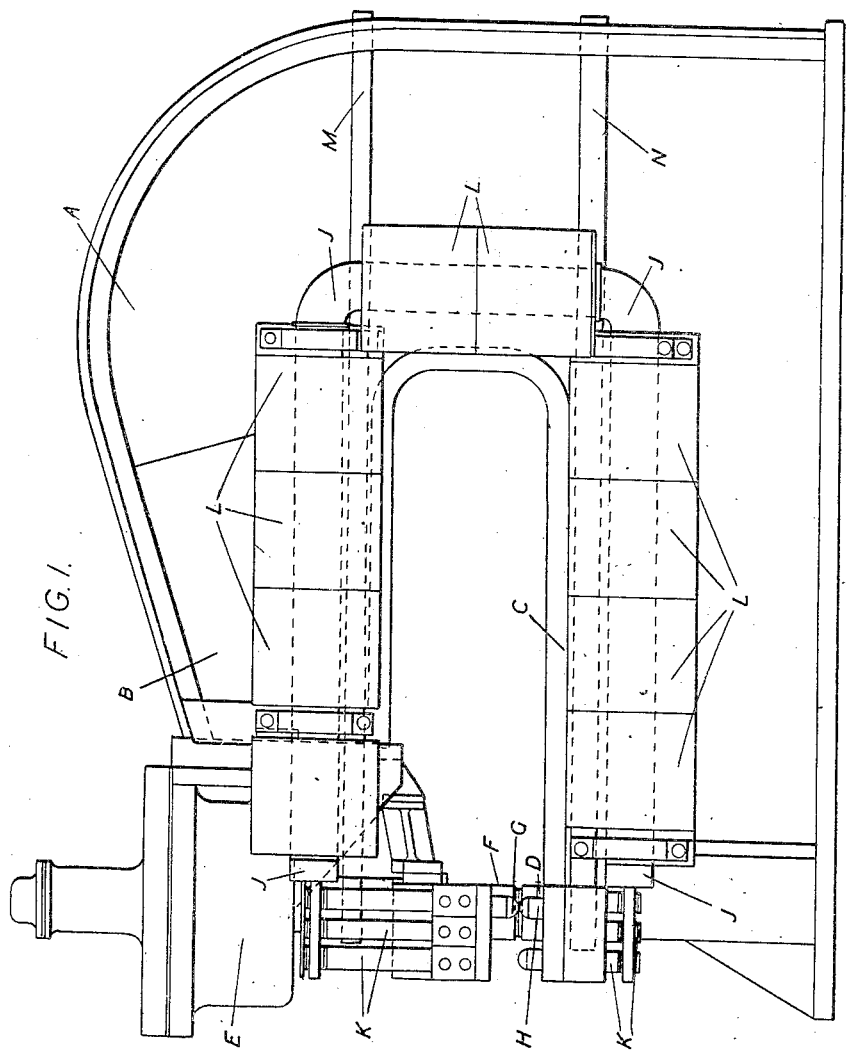

April 18, 1944. J. W. BAYLES 2,346,645
RESISTANCE WELDING MACHINE
Filed March 3, 1943 2 Sheets-Sheet 2

Inventor
J. W. Bayles
By Watson, Cole,
Grindle & Watson
Attorneys

Patented Apr. 18, 1944

2,346,645

UNITED STATES PATENT OFFICE 2,346,645

RESISTANCE WELDING MACHINE

John Wallis Bayles, Roker, Sunderland, England, assignor to A. Reyrolle & Company Limited, Hebburn-on-Tyne, England, a company of Great Britain Application March 3, 1943, Serial No. 477,857
In Great Britain April 14, 1942

6 Claims. (Cl. 219—4)

This invention relates to resistance welding machines and is particularly applicable although not confined to the machine described and claimed in the specification of the present applicant's United States of America Patent No. 2,280,369. In that specification the welding machine was provided with a transformer comprising a generally U-shaped conductor constituting a straight-through secondary connected at its ends to the electrodes for supplying current to them, and a plurality of sections of core and primary winding distributed along the secondary conductor. Short-circuited loops of conducting material could be provided to minimise reactance due to leakage flux passing through the frame and the space occupied by the work.

The present invention is concerned with particular arrangements of the short-circuited loops but is not necessarily confined to the distributed transformer since for purposes of economy or simplicity a bulk transformer might be employed.

According to the present invention a resistance welding machine comprises a pair of arms extending on opposite sides of the space for the work and carrying the electrodes, welding current conductors leading from the electrodes along the arms, and one or more short-circuited loops of conducting material mounted adjacent to the arms and the welding current conductors and each having a substantial projected area in a plane passing through it and through the welding current conductor.

Preferably one or each short-circuited loop has conductors extending longitudinally along the adjacent arm at substantially different distances from the welding current conductor.

One side of a short-circuited loop may extend longitudinally along the part of the adjacent arm nearest to the adjacent welding current conductor.

In one form of the invention the machine has two short-circuited loops each encircling one of the arms with opposite sides extending longitudinally alongside the arm on opposite sides of it.

The purpose of the short-circuited loops is to minimise the passage of leakage flux through the metal of the arm and the work, and in general such flux will be opposed if it has to pass through the loop. By means of the arrangements in accordance with the present invention the flux which can pass through the frame without passing through the loop is reduced to a minimum. Clearly if the loop were arranged for example in a plane at right angles to the line joining the welding current conductor to the arm, the flux could readily pass through the metal of the arm without passing through the loop but by employing an arrangement according to the present invention this possibility is reduced to a minimum.

Figure 2:
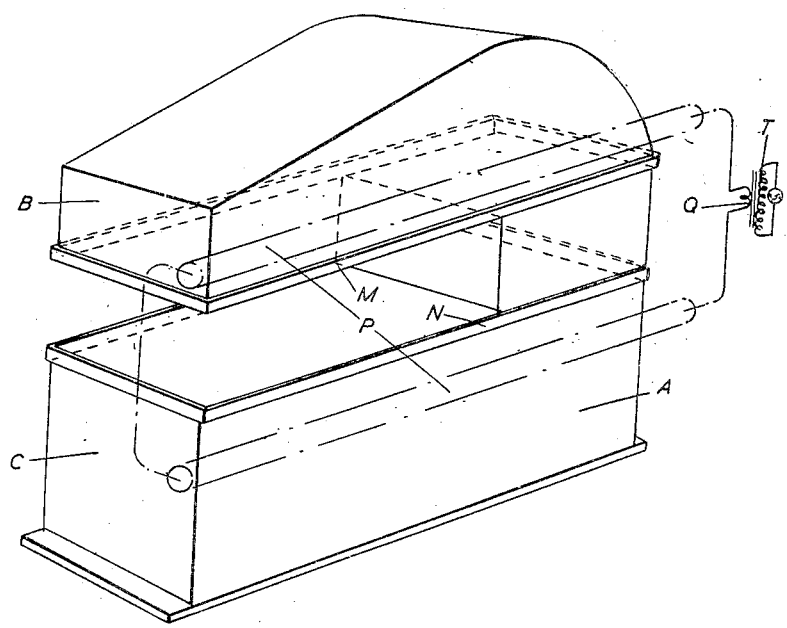

Two specific embodiments of the invention will be described by way of example with reference to the accompanying drawings in which Figure 1 is a side elevation showing the application of the invention to a welding machine as described in the prior patent referred to above, and Figure 2 is a diagrammatic perspective indicating the application of the invention to a machine employing a bulk transformer.

In order to minimise trouble due to indentation of the softened work by the pressure of the electrodes the machine is provided with clamping members separate from the electrodes arranged in accordance with British Patent No. 424,627.

Thus the main frame of the machine A has a pair of arms B and C extending above and below the space for the work. At their forward ends the lower arm carries the lower clamping member D whilst the upper arm carries a hydraulic cylinder E the ram of which carries the upper clamping member F. The clamping members are insulated from the arms to avoid the formation of a closed circuit through which current could circulate through the frame.

The electrodes G and H are offset laterally from the clamping members, that is to say they lie in a plane parallel to the central plane of the arms and clamping members. They are carried respectively by the two clamping members but are insulated from them and adjustably or resiliently connected to them, as for instance in accordance with British Patent No. 453,009, so that their pressure on the work can be proportioned appropriately to that of the clamping members.

The welding circuit, apart from the electrodes and their immediate connections, is constituted by a single water-cooled secondary conductor J bent to the form of a U and supported on the side of the arms B and C in a plane spaced considerably further than the electrodes from the central plane of the arms. The forward ends of this conductor are connected respectively to the two electrodes by means of flexible leads K serving to permit the movement of the electrodes.

Along, and each encircling, the secondary conductor are a number of sections of core L each having a section of primary winding wound on it. For example there may be four sections of core along the top limb, four along the bottom limb, and two along the generally vertical part constituting the base of the U. These sections are mounted along the secondary conductor as close as possible to each other so that they cover the greater part of the conductor, and in order to avoid leakage within the sections they are made with a close fit on the secondary conductor. As far as possible the proximity of magnetic materials to the transformer and conducting parts is avoided and the flexible leads K are reduced to the minimum length required for the movement of the electrodes, since these cannot be encircled by the sections of the transformer.

In order further to reduce leakage flux a pair of short-circuited loops M and N of conducting material are provided the upper one M encircling the upper arm B while the lower one encircles the lower arm C. In each case opposite sides of the loop extend longitudinally alongside the arm on opposite sides of it. One side will therefore extend close to the adjacent welding current conductor J while the opposite side is at a substantially greater distance from it.

While the preferred arrangement is one employing a distributed transformer, as shown in Figure 1, the invention is not limited to such arrangements but includes arrangements employing a single bulk transformer. Such an arrangement is shown diagrammatically in Figure 2. Similar parts are given the same references and will not be described again. Instead of a secondary conductor J there are a pair of welding current conductors P leading to the secondary winding Q of a bulk transformer T. For simplicity the electrodes and clamping means are omitted from Figure 2.

What I claim as my invention and desire to secure by Letters Patent is:

1. A resistance welding machine comprising a pair of arms extending on opposite sides of the space for the work, electrodes carried by the arms, welding current conductors leading from the electrodes along the arms, and at least one short-circuited loop of conducting material mounted adjacent the arms and the welding current conductors and each having a substantial projected area in a plane passing through it and through the welding current conductor.

2. A resistance welding machine comprising a pair of arms extending on opposite sides of the space for the work, electrodes carried by the arms, welding current conductors leading from the electrodes along the arms each in a plane laterally spaced from that containing the arms, and at least one short-circuited loop of conducting material mounted adjacent the arms and the welding current conductors and each having a substantial projected area in a plane passing through it and through the welding current conductor.

3. A resistance welding machine comprising a pair of arms extending on opposite sides of the space for the work, electrodes carried by the arms, welding current conductors leading from the electrodes along the arms, and at least one short-circuited loop of conducting material having conductors extending longitudinally along the arms at substantially different distances from the adjacent welding current conductor.

4. A resistance welding machine comprising a pair of arms extending on opposite sides of the space for the work, electrodes carried by the arms, welding current conductors leading from the electrodes along the arms, and at least one short-circuited loop of conducting material having one side extending longitudinally along the part of the adjacent arm nearest to the adjacent welding current conductor and an opposite side extending along a part of the arm at a substantially greater distance from said conductor.

5. A resistance welding machine comprising a pair of arms extending on opposite sides of the space for the work, electrodes carried by the arms, welding current conductors leading from the electrodes along the arms, and two short-circuited loops each encircling one of the arms with opposite sides extending longitudinally alongside the arm on opposite sides of it and at substantially different distances from the adjacent welding current conductor.

6. A resistance welding machine comprising a pair of arms extending on opposite sides of the space for the work, electrodes carried by the arms, welding current conductors leading from the electrodes along the arms each in a plane laterally spaced from that containing the arms, and two short-circuited loops each encircling one of the arms with opposite sides extending longitudinally alongside the arm on opposite sides of it and at substantially different distances from the adjacent welding current conductor.

JOHN WALLIS BAYLES.